May 12, 1970 R. E. RABE ET AL 3,511,979

SYSTEM FOR MEASURING AREA UNDER A CURVE

Filed Feb. 26, 1968

SAMPLE CURVE

INVENTORS
RICHARD E. RABE
ARTHUR CARNEVALE Jr.
BY Harry A. Herbert Jr.
George Line
ATTORNEYS

United States Patent Office 3,511,979
Patented May 12, 1970

3,511,979
SYSTEM FOR MEASURING AREA UNDER A CURVE
Richard E. Rabe and Arthur Carnevale, Jr., Rome, N.Y., assignors to the United States of America as represented by the Secretary of the Air Force
Filed Feb. 26, 1968, Ser. No. 708,059
Int. Cl. G06g 7/18
U.S. Cl. 235—183     1 Claim

ABSTRACT OF THE DISCLOSURE

A system for measuring the area under a curve by comparing it to the area of a rectangle whose X and Y dimensions are equal to the vertical and horizontal extremities of the curve. This is accomplished by positioning a record of the curve and its associated encompassing rectangle on the surface of an X–Y plotter. A calibration is first performed to provide a first meter reading of one hundred percent while tracing the record of the rectangle on the X–Y plotter. A second meter reading is then obtained by tracing the record of the curve on the X–Y plotter. The two readings thus permitting a computation of the actual area under the curve. The Y input signal to the plotter is a voltage whose amplitude is proportional to the height of the curve. The X input signal is a linearly increasing voltage along the horizontal length of the curves. Thus the output of the meter is proportional to the integrated Y signal.

BACKGROUND OF THE INVENTION

This invention relates to an electronics planimeter and more particularly to an electronic planimeter for finding the area under a curve.

Primarily the system of the present invention determines the area under a curve by comparing it to the area of a rectangle whose X and Y dimensions are equal to the vertical and horizontal extremities of the curve. Basically this is accomplished by integrating a voltage signal whose amplitude is proportional to the height of the curve over a specific length of time. Since calibration is based on a rectangle which encompasses the curve, the integrated voltage output signal will be proportional to the ratio between the area of curve and the rectangle. Thus the system of the present invention provides the capability of economically determining the area under a curve electronically. Past techniques involved the use of a mechanical planimeter of poor accuracy, actually measuring the area with a ruler.

SUMMARY OF THE INVENTION

The system of the present invention includes an operational amplifier with capacitive feedback effective as an integrator. If a DC (direct current) voltage is applied to the input of the integrator for a specific length of time, the output will be a linearly increasing voltage whose amplitude is directly proportional to the time of pulse length. This is assuming the time constant of the input resistance (R) and the feedback capacitor (C) is long enough. The system is calibrated so that if the maximum design voltage is applied to the input for the prescribed length of time, a meter at the output will read 100 percent. To determine the area under a curve, an X–Y plotter is connected so that the X-axis will sweep the length of the base line of the curve in the prescribed time. This is accomplished by applying a ramp voltage to the X-input which voltage increases linearly for the duration of a predetermined time. A variable DC voltage which lasts only for the predetermined time is applied simultaneously to the integrator input and the Y-input of the plotter. The variation of this voltage is caused by a potentiometer called the "height control." The peak of this voltage is limited to the maximum design voltage. The Y-axis of the plotter is adjusted with the plotter gain control so that the height of the scribe of the plotter is just equal to the peak vertical excursion of the curve. The X-axis gain control is used to adjust the X-axis so that the scribe just sweeps the base line of the curve. The zero adjust controls are set to place the plotter scribe at the lower left-hand corner of the curve before the gain controls are adjusted. The plotter starts sweeping at the same time the maximum design voltage is applied to the "height control" potentiometer. By normally varying this potentiometer, the plotter scribe can be made to follow the curve. At the end of the prescribed time, the output meter will indicate the percent of total area that the curve inscribes.

An object of the present invention is to provide an apparatus to determine the area under a curve by comparing it to the area of a rectangle whose X and Y dimensions are equal to the vertical and horizontal extremities of the curve.

Another object of the present invention is to provide apparatus to measure the area under a curve by electronically integrating a voltage proportional to the height of the curve over a specific length of time.

Various other objects, advantages, and features of novelty which characterize the invention are pointed out with particularity in the claims annexed hereto and forming part hereof. However, for a better understanding of the invention, its advantages and objects attained by its use, references should be had to the subjoining drawings, which form a part hereof, and to the accompanying descriptive matter, in which there is illustrated and described a preferred embodiment of the invention.

DESCRIPTION OF THE PREFERRED EMBODIMENT

Figure 1:
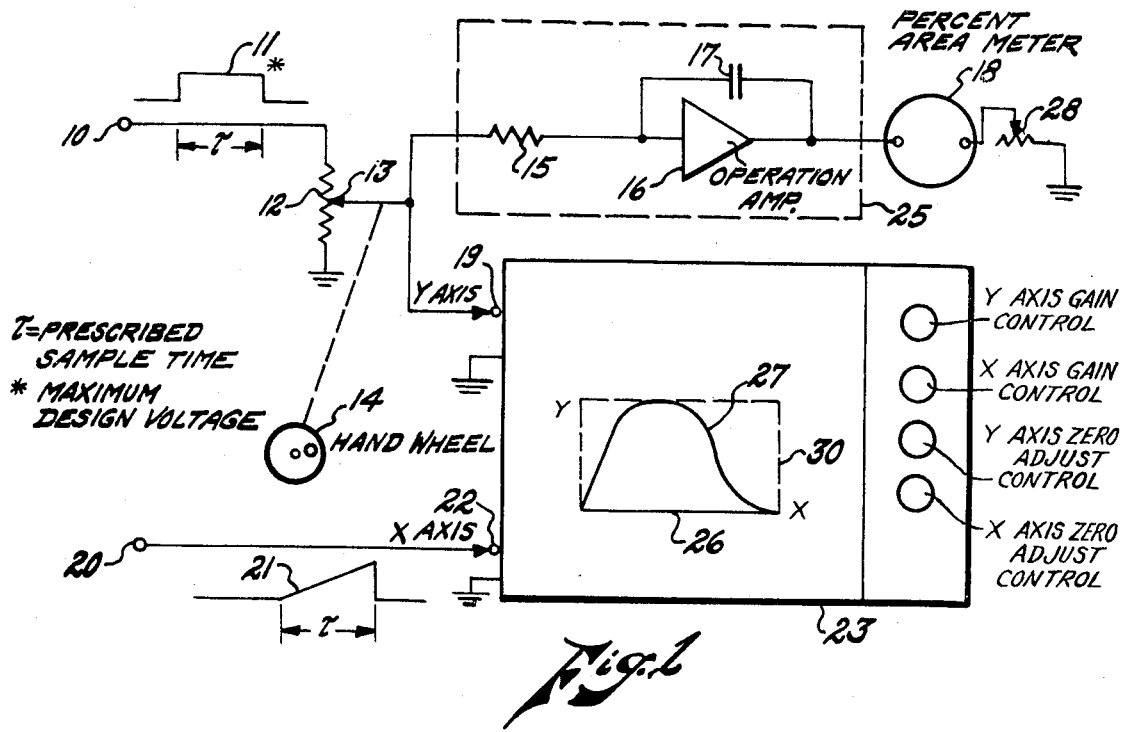
FIG. 1 shows a preferred embodiment of the present invention, partly in schematic and partly in block.

Now referring to FIG. 1, there is shown Y-input terminal 10 which receives waveform 11. Waveform 11 is a DC (direct current) voltage having a predetermined magnitude referred to as the maximum design voltage. Waveform 11 also has a predetermined sampling time ($\tau$) equal to the time necessary to traverse the horizontal length of the curve and its encompassing rectangle.

There is also provided operational amplifier 16 with capacitive feedback provided by capacitor 17 to make it integrator 25. Waveform 11 is applied to integrator 25 by way of movable arm 13 of potentiometer 12 and input resistance 15. Potentiometer 12 has movable arm 13 which is operated by hand wheel 14.

With the full DC voltage waveform 11 applied to integrator 25 by way of movable arm 13 for a specific length of pulse time ($\tau$), the output from the integrator is a linearly increasing voltage whose amplitude is directly proportional to the length of pulse time with the time constant of input resistance 15 and feedback capacitor 17 to be of sufficiently long duration.

The system of the present invention is calibrated in a first mode so that if the maximum design voltage is applied to the input for the predetermined length of time, meter 18 at the output will read 100 percent by adjusting calibrate potentiometer 28. To determine the area under a curve, X–Y plotter 23 is connected so that the scribe will sweep the length of base line 26 of curve 27 in the prescribed time, $\tau$. This is accomplished by applying a ramp voltage, such as waveform 21 with a time duration of τ, to the X-input terminal 20. The ramp voltage increases linearly for duration of the prescribed time, τ. In a second mode, a variable fraction of the DC voltage which lasts only for the predetermined length of time, τ, is applied simultaneously to the input of integrator 25 and to Y-input terminal 19 of the plotter. The variation of this voltage is caused by movable arm 13 which is called the "height control," The peak of this voltage is limited to the maximum design voltage. The Y-axis of plotter 23 is adjusted with the plotter gain control so that the height of the scribe is just equal to the peak vertical excursion of curve 27. The X-axis gain control is used to adjust the X-axis so that the scribe just sweeps base line 26 of curve 27. The zero adjust controls are set to place the plotter scribe at the lower left-hand corner of curve 27 before the gain controls are adjusted. Plotter 23 starts sweeping at the same time the maximum design voltage of waveform 11 is applied to "height control" potentiometer 12. By manually varying potentiometer 12 by activating hand wheel 14, the plotter scribe can be made to follow curve 27. At the end of the prescribed time, τ, output meter 18 will indicate the percent of total area that the curve inscribes. The X–Y plotter is well known in the prior art and is an off the shelf item that is manufactured and sold by several companies. It has been universally known as an X–Y plotter or X–Y recorder, the terms being interchangeable and is as described at page 383 of vol. II of McGraw-Hill Encyclopedia of Science and Technology, published in 1966. It is also manufactured and sold by Hewlett-Packard in Models 7035B, 135, 135A, 136A, 7005B; by Honeywell Test Instruments Division, Denver, Colo.; and by Houston Instrument of Bellaire, Tex.

The source of all voltages and waveforms for the above-described system may be an oscilloscope such as Tektronix 530 or 540 series. The sawtooth output therefrom may be used for the Y-axis sweep of X–Y plotter 23 and is waveform 21. The Gate output from the aforesaid oscilloscope is the maximum design voltage (waveform 11) and is received by terminal 10. Both of these voltages occur for the length of the oscilloscope sweep and are thus synchronized. The 6.3 v. AC output from the oscilloscope may be rectified and used to provide a trigger voltage to initiate the operation by feeding it to the external sync of the oscilloscope.

It is to be noted that input resistance to integrator 25 was 15 megohms and the feedback capacitor was in the order of 1 microfarad. Percent area meter 18 is a 100 microammeter and calibrate potentiometer 28 is 1 megohm. The combination of meter 18 and potentiometer 28 is used to measure the output voltage which in turn provides an area percent reading. The "height control" potentiometer 12 has three turns and has a 10K ohm magnitude.

Calibration of the system of the present invention is quite simple. It was determined experimentally that 20 seconds was an adequate sampling time, and the oscilloscope sweep is set for aforesaid 20 seconds. To calibrate percent area meter 18, the "height control" potentiometer 12 is set to maximum, thus applying the full waveform 11 to integrator 25, and there is a sweep for 20 seconds. At the end of this time, integration is complete. Using calibrate potentiometer 28, set meter 18 to read 100 percent. Integration calibration is now complete, and any other setting of "height control" potentiometer 12 will produce a meter reading less than 100 percent.

Figure 2:
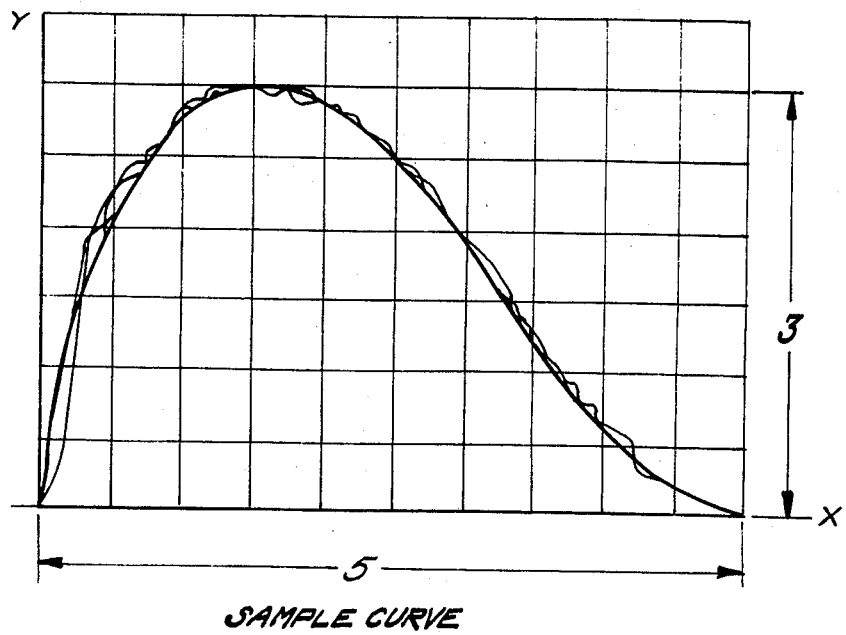
FIG. 2 shows a sample curve utilized in testing the embodiment of FIG. 1.

To set up X–Y plotter 23, place record of curve 27 on the plotter table. Rectangle 30 should be drawn around curve 27 for ease of set up. Adjust X and Y controls to place the scribe of plotter 23 on the lower left-hand corner of curve 27. Set "height control" potentiometer 12 to minimum by operating hand wheel 14 and start the sweep. Adjust the amplitude of the X-axis so the scribe just reaches the right side at the end of the sweep time. Now set "height control" potentiometer 12 to maximum, and while the system is sweeping adjust the Y-axis amplitude to positon the scribe at the top of rectangle 30 (maximum height of curve 27). All calibration is now complete. After calibration, a sample curve was run as illustrated in FIG. 2. The sample curve has a manually measured area of 8.48 square inches. Since the area of the rectangle is 15.00 square inches, the percent area is 56.5 percent. Three runs on this curve produced readings of 56, 56 and 57.

Numerous objects and advantages of the invention have been set forth in the foregoing description together with details of the structure and function of the invention, and the novel features thereof are pointed out in the appended claims. This disclosure, however, is illustrative only, and changes may be made in detail, especially in matters of shape, size, and arrangement of parts, within the principle of the invention to the full extent indicated by the broad general meaning of the terms in which the appended claims are expressed.

What is claimed is:

1. An electronic planimeter for measuring an area under a preselected curve comprising an X–Y plotter having a scribe, X and Y input terminals, and X and Y axis, a record of said curve positioned on said X–Y plotter, a rectangle drawn on said record, said rectangle encompassing said curve and having X and Y dimensions equal to the vertical and horizontal extremities of said curve, a first potentiometer receiving a maximum design voltage waveform of preselected magnitude and time duration, said first potentiometer having a movable arm, an electronic integrator having a preselected time constant, said electronic integrator receiving the output signal from said movable arm, said output signal also being simultaneously received by said Y input terminal to control the movement of said scribe along said Y axis, a second potentiometer, a microammeter receiving the output of said electronic integrator, said microammeter being connected to ground by way of said second potentiometer, means to apply a linear ramp voltage to said X-input terminal to control the movement of said scribe along said X-axis in a linear mode, said linear ramp voltage and said maximum design voltage waveform having the identical time duration and being synchronized to start at an identical time, and hand wheel means to actuate said movable arm of said first potentiometer during a first application of said ramp voltage and said maximum design voltage waveform to first trace the top of said encompassing rectangle to provide a calibration and first reading of one hundred percent on said microammeter by adjusting said second potentiometer during the first trace, and next tracing said curve upon a second application of said ramp voltage and said maximum design voltage to obtain a second reading on said microammeter, said second reading being a measure of said area under said curve.

References Cited
UNITED STATES PATENTS

| | | | |
|---|---|---|---|
| 2,842,740 | 7/1958 | Sparks | 235—183 X |
| 3,145,297 | 8/1964 | Felix | 235—183 |
| 3,307,019 | 2/1967 | Woodard et al. | 235—183 X |

MALCOLM A. MORRISON, Primary Examiner

F. D. GRUBER, Assistant Examiner

U.S. Cl. X.R.

33—121, 123; 235—61.6; 328—127